United States Patent [19]
Hsu

[11] Patent Number: 5,979,065
[45] Date of Patent: Nov. 9, 1999

[54] HANDLE ASSEMBLY FOR A FOLDABLE SAW

[76] Inventor: An-Sun Hsu, No. 99, Yu-Ai St., Tainan City, Taiwan

[21] Appl. No.: 09/095,867

[22] Filed: Jun. 11, 1998

[51] Int. Cl.[6] .................................................. B27B 21/00
[52] U.S. Cl. ................................ 30/519; 30/161; 30/331
[58] Field of Search ............................ 30/160, 161, 331, 30/339, 519, 517, 514

[56] References Cited

U.S. PATENT DOCUMENTS

| | | | |
|---|---|---|---|
| 1,405,867 | 2/1922 | Remington | 30/519 |
| 2,747,631 | 5/1956 | Behlefeldt | 30/519 |
| 4,730,394 | 3/1988 | Sonner | 30/161 |
| 5,553,386 | 9/1996 | Hsu . | |
| 5,661,908 | 9/1997 | Chen | 30/519 X |
| 5,722,168 | 3/1998 | Huang | 30/160 X |

*Primary Examiner*—Douglas D. Watts
*Attorney, Agent, or Firm*—Harness, Dickey & Pierce, P.L.C.

[57] ABSTRACT

A handle assembly includes a handle body formed with a longitudinal blade receiving space, a coupling member mounted on the handle body within the blade receiving space and confining an insert slit aligned and communicated with the blade receiving space, and a locking unit extending movably and transversely through the handle body and having wider and narrower sections. The locking unit extends through the coupling member to permit pivoting of the coupling member relative to the handle body. The insert slit is adapted to permit extension of a saw blade thereinto via a front opening of the coupling member. The locking pin is movable between an unlocking position, in which the narrower section is registered with the insert slit to permit movement of the locking unit into and out of a locking hole of the saw blade, and a locking position, in which the wider section is registered with the insert slit for engaging the locking hole of the saw blade. The coupling member rotates with the saw blade between unfolded and folded positions. A positioning unit mounted on the handle body is operable to engage releasably the coupling member to lock the same in a selected one of the folded and unfolded positions.

8 Claims, 11 Drawing Sheets

HANDLE ASSEMBLY FOR A FOLDABLE SAW

BACKGROUND OF THE INVENTION

1. Field of the Invention

This invention relates to a handle assembly for use with a saw blade to form a foldable saw, more particularly to a handle assembly which facilitates mounting and detaching of a saw blade and which permits folding and unfolding of the saw blade on the handle assembly.

2. Description of the Related Art

U.S. Pat. No. 5,553,386 discloses a foldable saw which includes an elongated handle member, a saw blade, and a locking unit. The handle member has opposite side walls and a top wall which bridges the side walls. The side walls confine a longitudinal slit therebetween. The saw blade is formed as an elongated flat plate with a teethed edge. The saw blade has a tip and a rounded end portion which is opposite to the tip and which is mounted pivotally on the handle member such that the saw blade is pivotable between a folded position, wherein the saw blade is concealed within the slit of the handle member, and an unfolded position, wherein the saw blade is extended from the handle member. The locking unit is mounted on the handle member and is operable so as to engage releasably the rounded end portion of the saw blade to lock the saw blade in a selected one of the folded and unfolded positions. The saw blade has an indented section located between the rounded end portion and the teethed edge. The top wall of the handle member is formed with a through hole which extends to the slit and which is aligned with the indented section of the saw blade when the saw blade is in the folded position. The through hole has a release spring disposed therein. The through hole further has an internally threaded upper section which engages an externally threaded plug that abuts against one end of the release spring. The release spring is compressed by the saw blade when the saw blade is locked by the locking unit in the folded position. The release spring expands to cause the tip of the saw blade to project out of the slit of the handle member when the locking unit is operated to unlock the saw blade from the folded position. The rounded end portion of the saw blade is sized so as to abut against the release spring when the saw blade is in the unfolded position.

The saw blade is mounted pivotally on the handle member by means of a bolt that extends through a pivot hole in the saw blade and through the handle member to engage a nut. When the saw blade is to be removed from the handle member for replacement with a new one, the bolt must be unthreaded from the nut with the use of a tool so as to disengage the same from the saw blade and the handle member. After a new saw blade is inserted into the handle member, the bolt must be extended through the saw blade and the handle member for threadedly engaging the nut. Although the foldable saw permits removal of the saw blade for replacement, threading and unthreading operations of the bolt are necessary. Thus, the replacement operation of the saw blade of the conventional saw is not convenient to conduct.

SUMMARY OF THE INVENTION

The main object of the present invention is to provide a handle assembly which facilitates mounting and detaching of a saw blade and which permits folding and unfolding of the saw blade on the handle assembly.

Accordingly, the handle assembly of the present invention is adapted for use with a saw blade to form a foldable saw. The saw blade is formed as an elongated flat plate with a top edge, a teethed bottom edge, a rear edge which extends between the top and bottom edges, and a rear end portion which is formed with a locking hole and a slot that extends from the locking hole to the rear edge. The handle assembly includes an elongated handle body, a coupling member, a locking unit, and a positioning unit. The handle body has left and right side walls that confine a longitudinal blade receiving space therebetween, a top wall that bridges top ends of the side walls, and a front end portion. The coupling member is mounted on the front end portion of the handle body within the blade receiving space. The coupling member has left and right walls which confine an insert slit therebetween, a front side formed with a front opening for access into the insert slit, and a rear side formed with a curved edge. The insert slit is aligned and communicated with the blade receiving space. The locking unit extends transversely between the left and right side walls of the handle body, and has a wider section with a cross-section corresponding with the locking hole of the saw blade, and a narrower section with a cross-section smaller than the locking hole. The locking unit extends through the left and right walls of the coupling member, and permits rotation of the coupling member relative to the handle body about the locking unit. The locking unit is mounted movably to the left and right side walls of the handle body so as to be movable therebetween for registering a selected one of the wider and narrower sections with the insert slit of the coupling member. The insert slit of the coupling member is adapted to permit extension of the rear end portion of the saw blade thereinto via the front opening. The locking pin is operable between an unlocking position, in which the narrower section is registered with the insert slit of the coupling member to permit movement of the locking unit into and out of the locking hole of the saw blade for insertion of the saw blade into the insert slit and for removal of the saw blade from the insert slit, and a locking position, in which the wider section is registered with the insert slit and is adapted to engage the locking hole of the saw blade to prevent removal of the saw blade from the insert slit. The coupling member is provided with abutment means adapted for engaging the rear end portion of the saw blade when the rear end portion of the saw blade is extended into the coupling member so that the coupling member is rotatable together with the saw blade relative to the handle body and about the locking unit between an unfolded position, in which the saw blade extends outwardly of the handle body, and a folded position, in which the saw blade is concealed within the blade receiving space of the handle body. The positioning unit is mounted on the handle body and is operable so as to engage releasably the curved edge on the rear side of the coupling member to lock the coupling member in a selected one of the folded and unfolded positions.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

Figure 1:
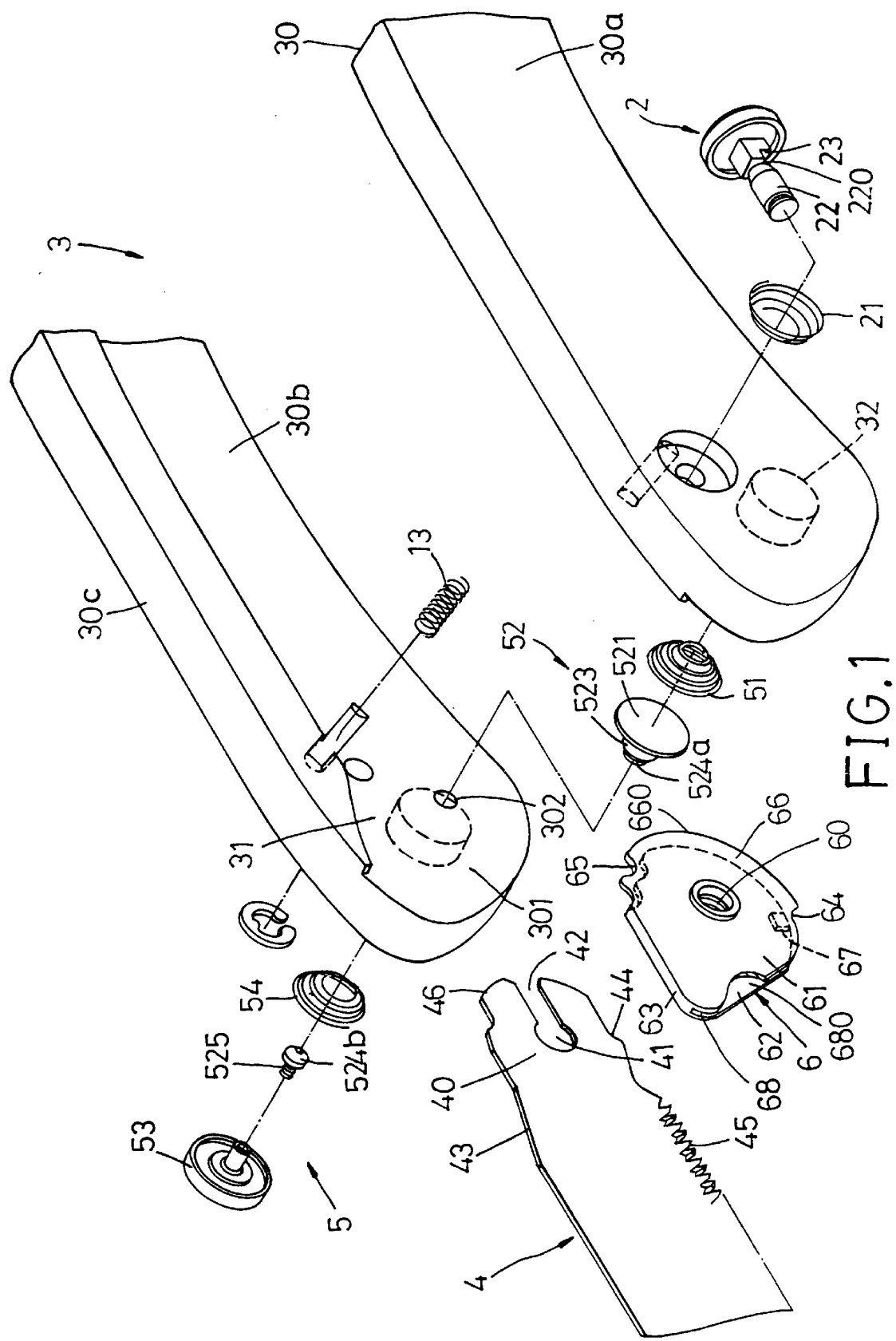
FIG. 1 is an exploded fragmentary perspective view of a first preferred embodiment of the handle assembly of the present invention and a saw blade for use therewith.

Referring to FIG. 1, the handle assembly 3 of the first preferred embodiment of the present invention is to be used with a saw blade 4 which is formed as an elongated flat plate with a top edge 43, a teethed bottom edge 45, a rear edge 46 extending between the top and bottom edges 43, 45, and a rear end portion 40 formed with a locking hole 41 and a slot 42 between the locking hole 41 and the rear edge 46. An abutment corner 44 is formed on the bottom edge 45 adjacent to the rear end portion 40.

Figure 2:
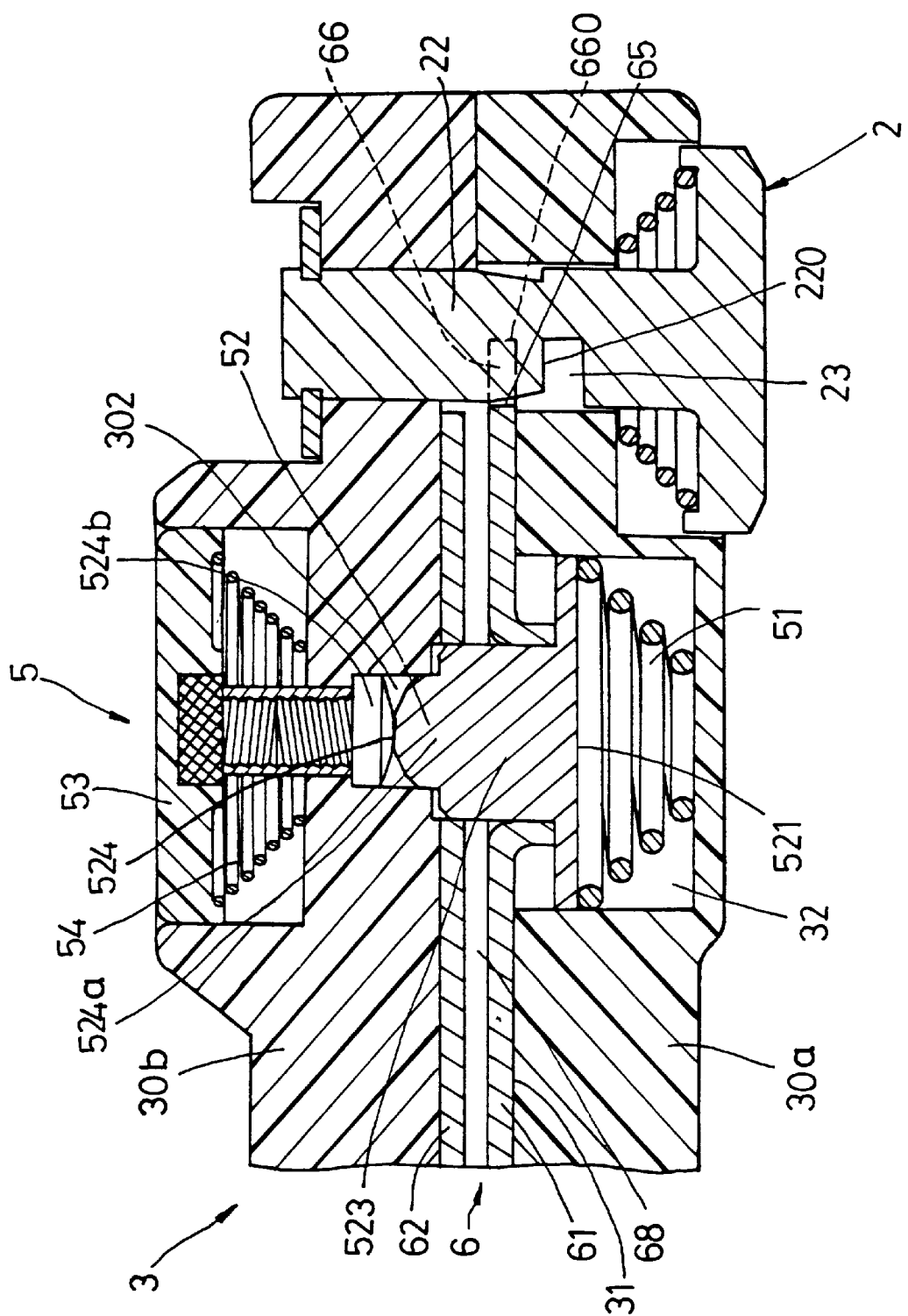
FIG. 2 is a horizontal fragmentary sectional view of the first preferred embodiment when viewed from a top side while a locking unit thereof is disposed in a locking position.

Referring to FIGS. 1 and 2, the handle assembly 3 of the first preferred embodiment is shown to include an elongated handle body 30, a coupling member 6, a locking unit 5, a positioning unit 2, and a release spring 13. FIG. 2 is taken along line II—II in FIG. 7.

The handle body 30 has left and right side walls 30a, 30b which confine a longitudinal blade receiving space 31 therebetween, a top wall 30c that bridges top ends of the side walls 30a, 30b, and a front end portion 301. The blade receiving space 31 opens forwardly and downwardly for receiving the saw blade 4. The front end portion 301 is formed with a pivot hole 302 which extends through the right side wall 30b.

The release spring 13 is disposed within the handle body 30 between the left and right side walls 30a, 30b, and extends into the blade receiving space 31. The release spring 13 is similar to that in the aforementioned prior art.

The positioning unit 2 includes a shaft 22 which extends transversely between the left and right side walls 30a, 30b of the handle body 30 and which is spaced apart from the pivot hole 302. The shaft 22 is formed with a notch 23 which opens in a direction toward the pivot hole 302, and an abutment shoulder 220 adjacent to the notch 23. The shaft 22 is mounted movably to the left and right side walls 30a, 30b of the handle body 30 so as to be movable therebetween. The positioning unit 2 further includes a biasing spring 21 sleeved around the shaft 22.

The locking unit 5 extends through the pivot hole 302 of the handle body 30 and is mounted movably and transversely to the left and right side walls 30a, 30b so as to be movable therebetween. The locking unit 5 includes a first biasing spring 51 which is received in a spring recess 32 formed on an inner side of the left side wall 31a that faces the blade receiving space 31. A locking pin 52 has a first end 521 formed as a widened abutment wall that extends into the spring recess 32 in the left side wall 30a, a wider section 523 adjacent to the first end 521 and having a cross-section corresponding to the locking hole 41 of the saw blade 4, a narrower section 524 adjacent to the wider section 523, and a threaded second end 525 adjacent to the narrower section 524. A press knob 53 engages the threaded second end 525 and is disposed outwardly of the handle body 30. A second biasing spring 54 is sleeved around the locking pin 52 between the handle body 30 and the press knob 53. In the present embodiment, the narrower section 524 includes adjacent and separable first and second segments 524a, 524b which are biased by the first and second biasing springs 51, 54 to move toward one another for abutment against each other. Each of the first and second segments 524a, 524b has a cross-section smaller than the slot 42 of the saw blade 4.

The coupling member 6 is mounted on the front end portion 301 of the handle body 30 within the blade receiving space 31. The coupling member 60 includes left and right walls 61, 62 which confine an insert slit 68 therebetween, and a top wall 63 interconnecting top ends of the left and right walls 61, 62. A mounting hole 60 is formed through the left and right walls 61, 62 and is aligned with the pivot hole 302 of the handle body 30 to permit extension of the locking unit 5 therethrough for mounting the coupling member 6 pivotally to the handle body 30. The left wall 61 has a portion which projects rearwardly relative to the right wall 62 to define a flange 66 on a rear side of the coupling member 6. The flange 66 is formed with opposite upper and lower positioning grooves 65, 64, and a curved edge 660 between the upper and lower positioning grooves 65, 64. The right wall 62 has a lower end formed with a stop protrusion 67 which projects into the insert slit 68. A front opening 680 is formed on a front side of the coupling member 6 between the top wall 63 and the stop protrusion 67 for access into the insert slit 68. The insert slit 68 is adapted to permit insertion of the saw blade 4 thereinto via the front opening 680.

Figure 3:
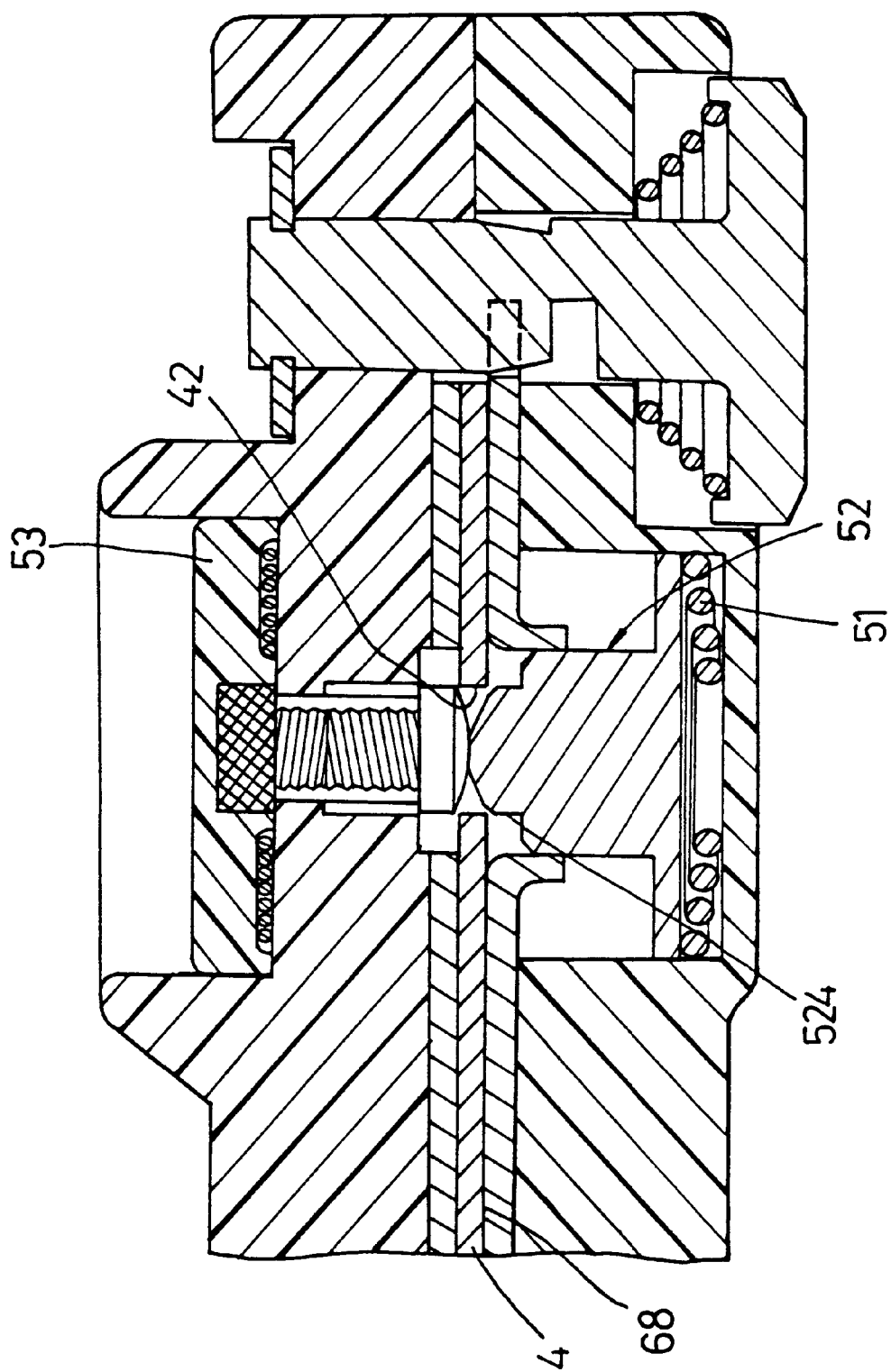
FIG. 3 is a horizontal fragmentary sectional view of the first preferred embodiment when viewed from a top side while the locking unit is disposed in an unlocking position and while the saw blade is inserted into the handle assembly.
Figure 4:
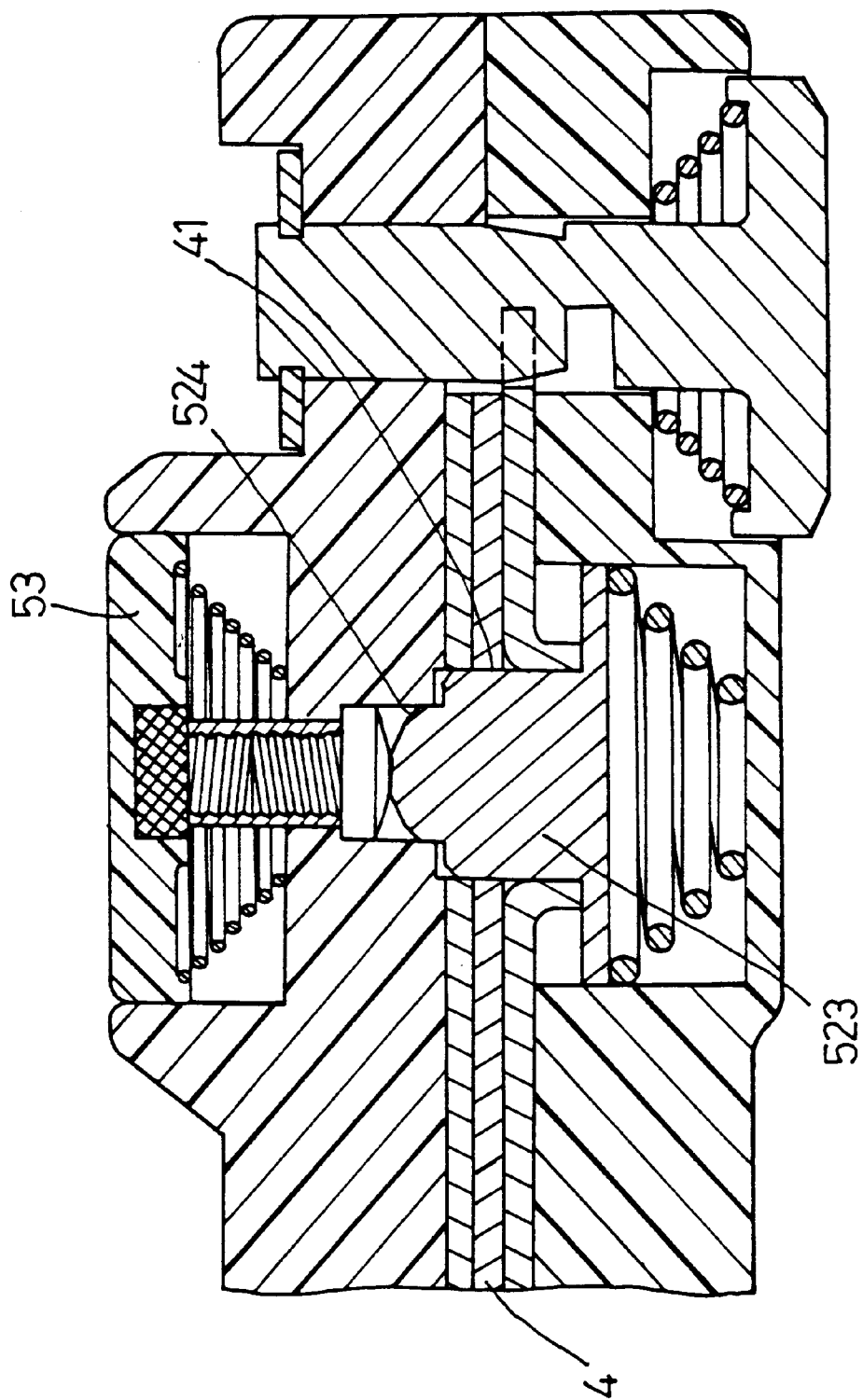
FIG. 4 is a horizontal fragmentary sectional view of the first preferred embodiment when viewed from a top side while the locking unit is disposed in a locking position and while the saw blade is inserted into the handle assembly.

Referring to FIGS. 2 to 4, when assembling the saw blade 4 to the handle assembly 3 of the first preferred embodiment, the press knob 53 is pressed to move the locking pin 52 against the biasing action of the first biasing spring 51 to an unlocking position, in which the narrower section 524 is registered with the insert slit 68 of the coupling member 6, as shown in FIG. 3. Since the cross-section of the narrower section 524 is smaller than the slot 42 of the saw blade 4, the locking pin 52 is permitted to move into the locking hole 41 of the saw blade 41 via the slot 42 to permit insertion of the saw blade 4 into the insert slit 68 via the front opening 680 (see FIG. 1).

Thereafter, the pressure applied on the press knob 53 is released so that the locking pin 52 is biased by the first biasing spring 51 to move to a locking position, in which the wider section 523 is registered with the insert slit 68 to engage the locking hole 41 and to prevent removal of the saw blade 4 from the coupling member 6, as shown in FIG. 4. Assembly of the saw blade 4 to the handle assembly 3 is completed.

Figure 6:
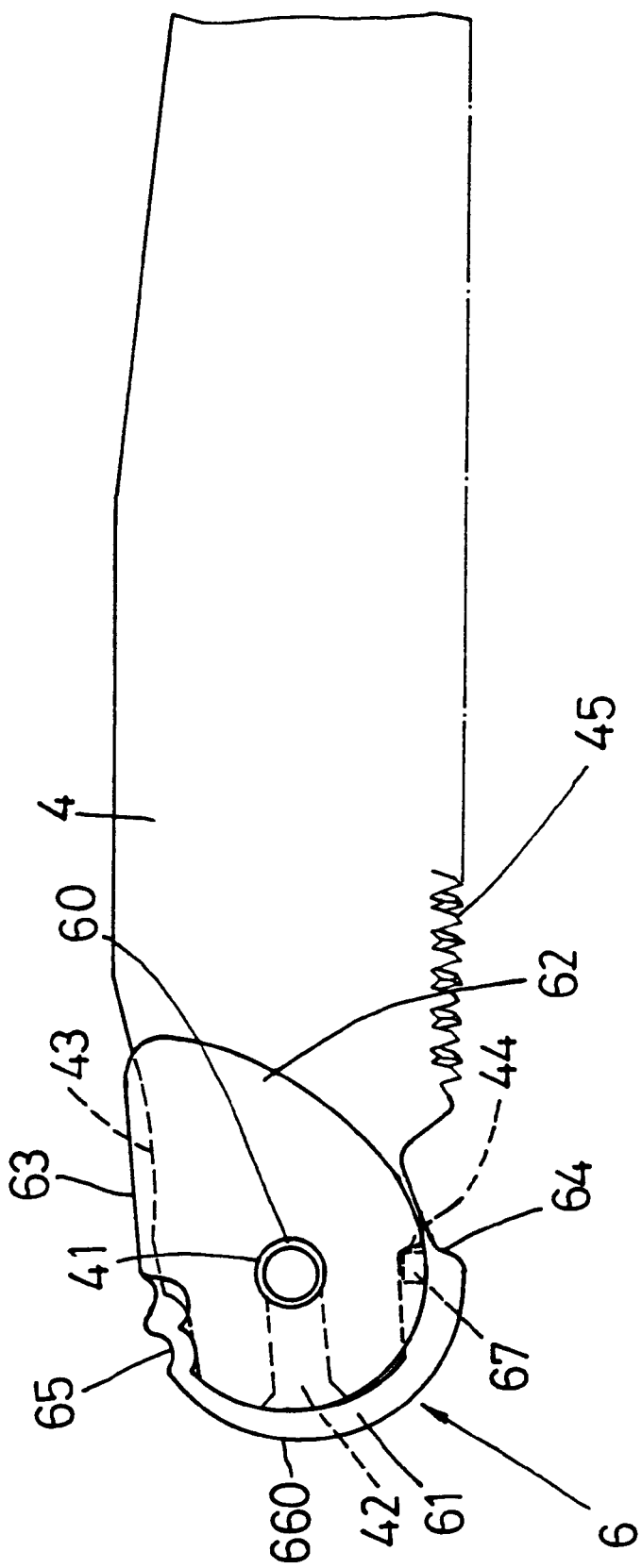
FIG. 6 is a schematic side view illustrating the relative positions of a coupling member of the handle assembly of the first preferred embodiment and a saw blade which is inserted into the coupling member.

At this time, as shown in FIG. 6, the top wall 63 of the coupling member 6 abuts against the top edge 43 of the saw blade 4, while the stop protrusion 67 of the coupling member 6 abuts against the abutment corner 44 formed on the bottom edge 45 of the saw blade 4. The top wall 63 and the stop protrusion 67 thus constitute an abutment unit for clamping the saw blade 4 therebetween so that the saw blade 4 is rotatable together with the coupling member 6 relative to the handle body 30 and about the locking unit 5.

Figure 7:
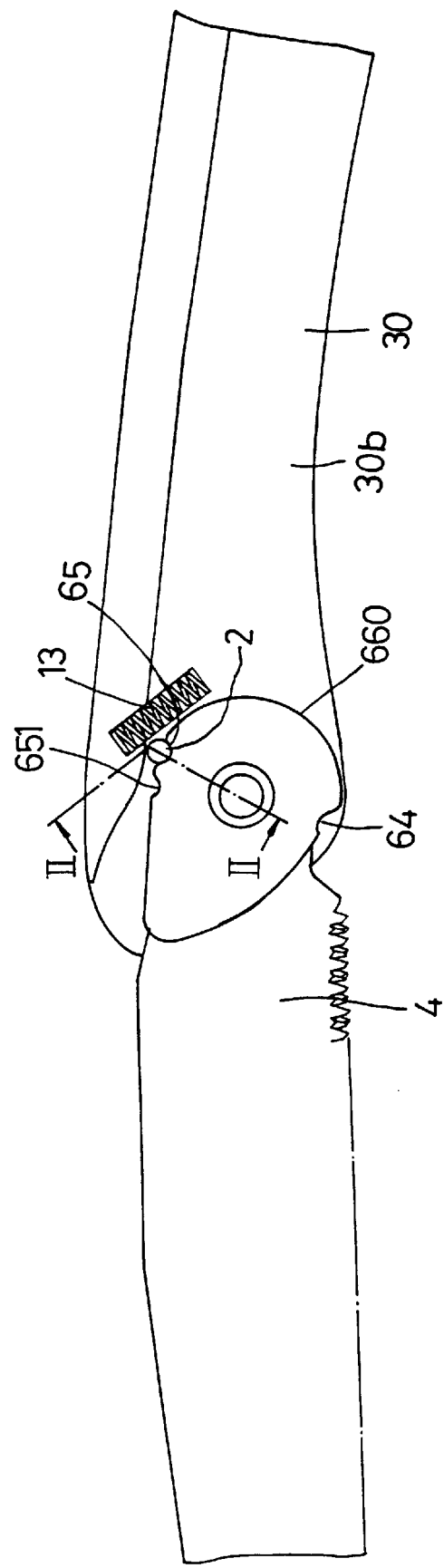
FIG. 7 is a schematic side view of the first preferred embodiment when in an unfolded position.

FIG. 7 illustrates the coupling member 6 and the saw blade 4 when they are in an unfolded position, in which the saw blade 4 extends out of the handle body 30 and has a longitudinal axis substantially aligned with that of the handle body 30. In this situation, as shown in FIG. 4, the shaft 22 of the positioning unit 2 is disposed in a first position, in which the shaft 22 is biased by the biasing spring 24 to align with the blade receiving space 31 to engage the upper positioning groove 65 of the coupling member 7 in order to position the saw blade 4 and the coupling member 6 in the unfolded position.

Figure 8:
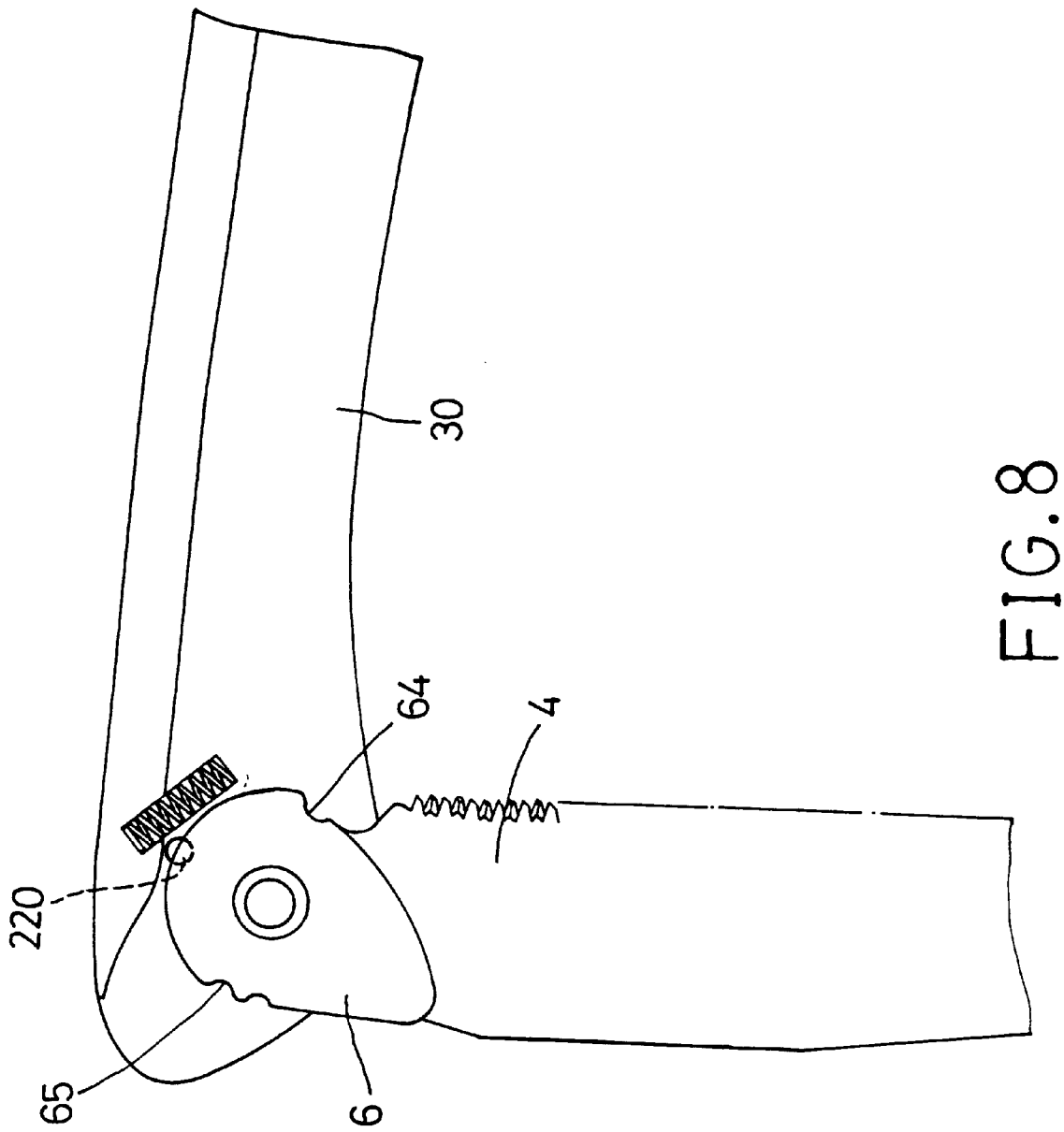
FIG. 8 is a schematic side view of the first preferred embodiment when the saw blade is moved from the unfolded position toward a folded position.
Figure 9:
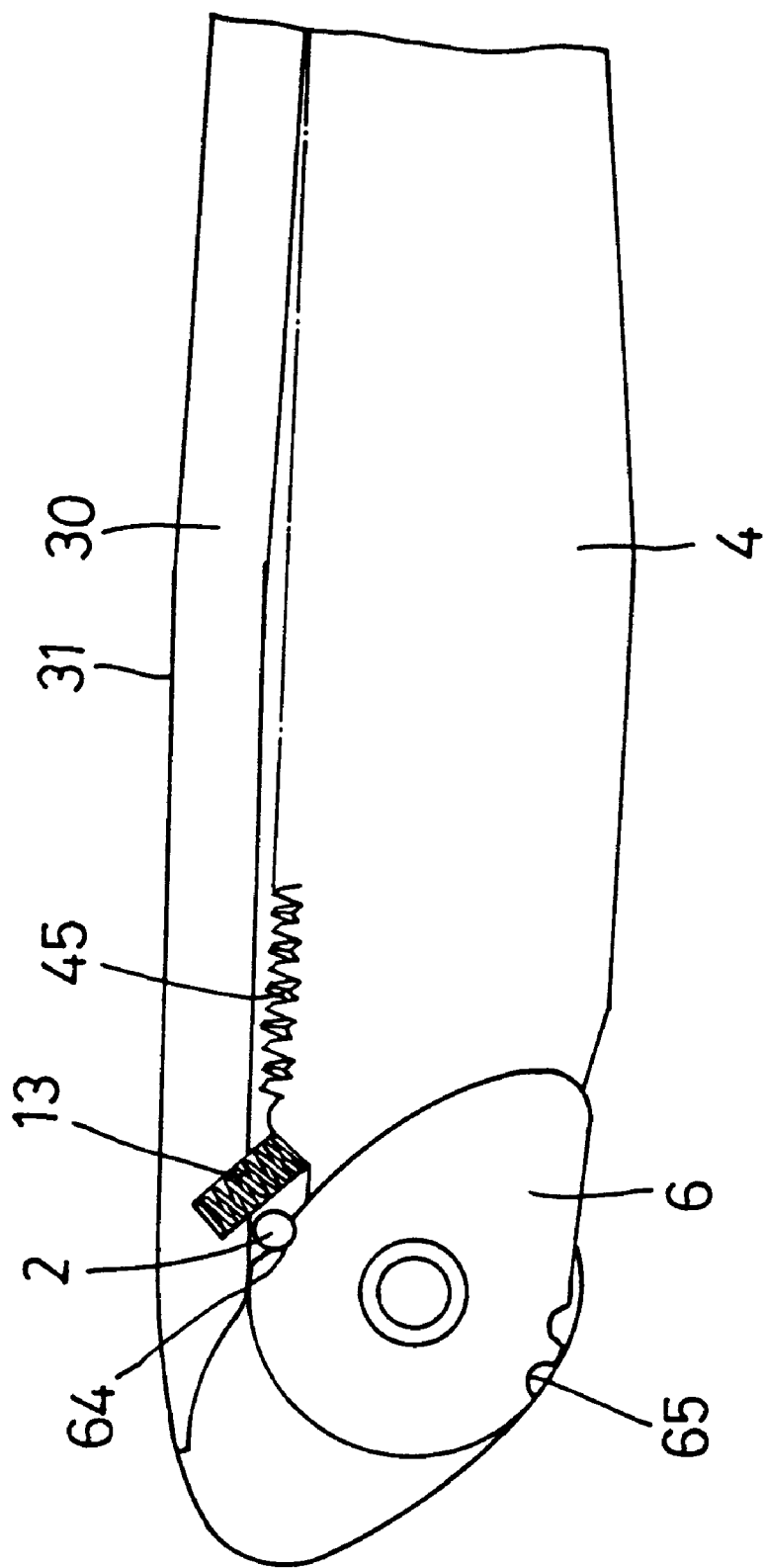
FIG. 9 is a schematic side view of the first preferred embodiment illustrating the handle assembly when in the folded position.

To fold the saw blade 4, the positioning unit 2 is pressed to move the shaft 22 against the biasing force of the biasing spring 24 from the first position to a second position, in which the notch 23 is aligned with the blade receiving space 31 for disengaging the shaft 22 from the upper positioning groove 65 of the coupling member 6. As shown in FIG. 8, the coupling member 6 and the saw blade 4 are thus permitted to pivot relative to the handle body 30 from the unfolded position (see FIG. 7) to a folded position, in which the saw blade 4 is concealed within the blade receiving space 31 of the handle body 30, as shown in FIG. 9. Since the coupling member 6 has been disengaged from the shaft 22 of the positioning unit 2, the pressing force applied on the positioning unit 2 can be released during pivoting movement of the saw blade 4 and the coupling member 6 relative to the handle body 30. Referring to FIG. 9, when the saw blade 4 is moved together with the coupling member 6 to the folded position, the shaft 22 of the positioning unit 2 engages the lower positioning groove 64 to position the coupling member 6 and the saw blade 4 in the folded position. In this situation, the release spring 13 has a lower end abutting against the teethed bottom edge 45 of the saw blade 4, and is compressed by the saw blade 4.

Accordingly, to unfold the saw blade 4, the positioning pin 2 is pressed once again to align the notch 23 with the lower positioning groove 64 for disengaging the shaft 22 from the coupling member 6 (see FIG. 4). At this time, since the saw blade 4 is not restricted by the positioning unit 2 from pivoting movement about the handle body 30, the release spring 13 expands to cause a tip portion of the saw blade 4 to project out of the blade receiving space 31 of the handle body 30. Since the lower positioning groove 64 has been moved away from the shaft 22, the force applied on the positioning unit 2 can be released at this time. When the tip portion is latched on an object, such as a worktable, the handle body 30 can be pivoted so that the saw blade 4 can be extended from the handle body 30 and so that the upper positioning groove 65 engages the shaft 22 once again to position the saw blade 4 in the unfolded position.

Referring again to FIG. 8, it is noted that during the pivoting movement of the coupling member 6 about the handle body 30 for folding and unfolding the saw blade 4, the curved edge 660 of the flange 66 on the rear side of the coupling member 6 extends into the notch 23 to abut against the abutment shoulder 220 due to the action of the biasing spring 21. The folding and unfolding operations of the saw blade 4 are guided in a continuous and smooth pathway by the curved edge 660.

Figure 10:
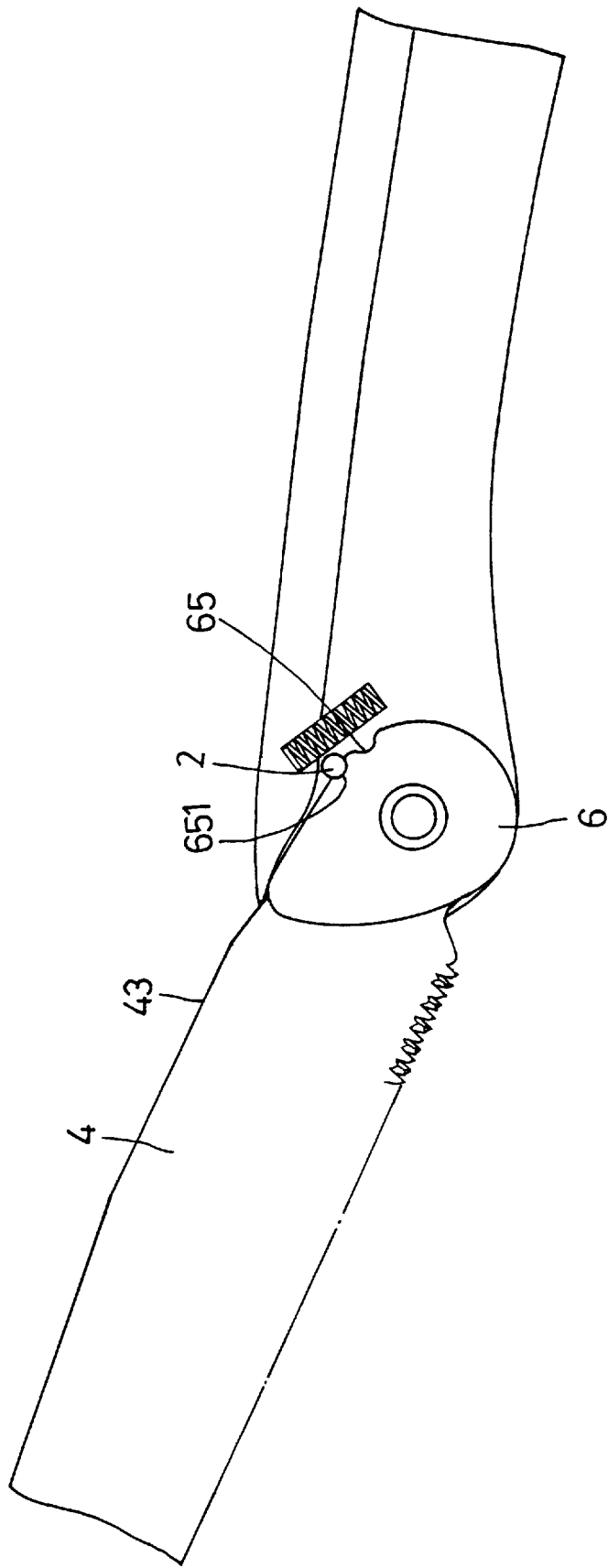
FIG. 10 is a schematic side view of the first preferred embodiment when in a position for special use.
Figure 11:
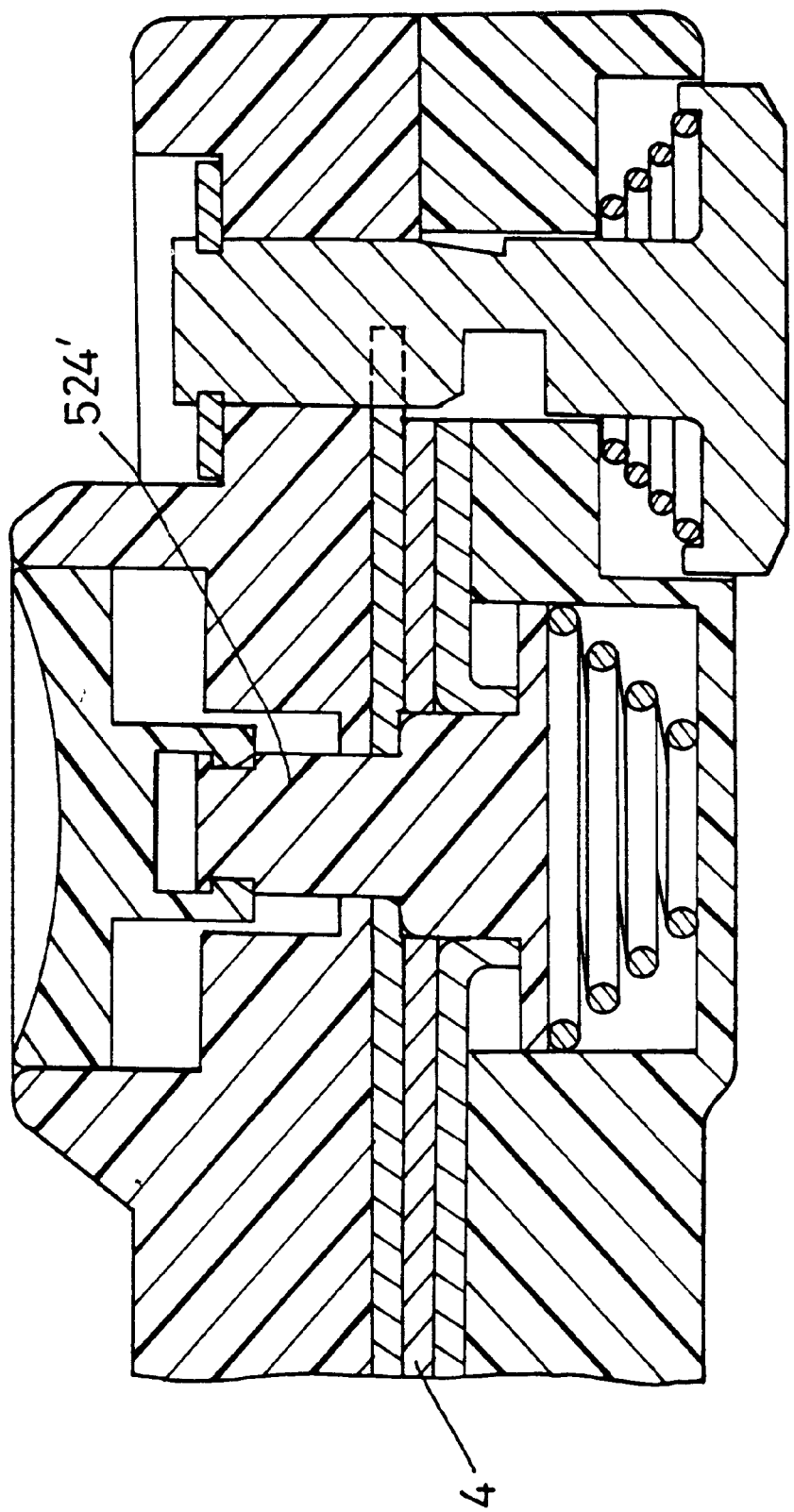
FIG. 11 is a horizontal fragmentary sectional view of a third preferred embodiment of the present invention when viewed from a top side.

FIG. 10 illustrates the saw blade 4 in another unfolded state, in which the top edge 43 of the saw blade 4 forms an obtuse angle with the top wall of the handle body 30 and in which the positioning unit 2 engages a positioning groove 651 formed adjacent to the upper positioning groove 65 to permit operation of the saw blade 4 under a special state.

Figure 5:
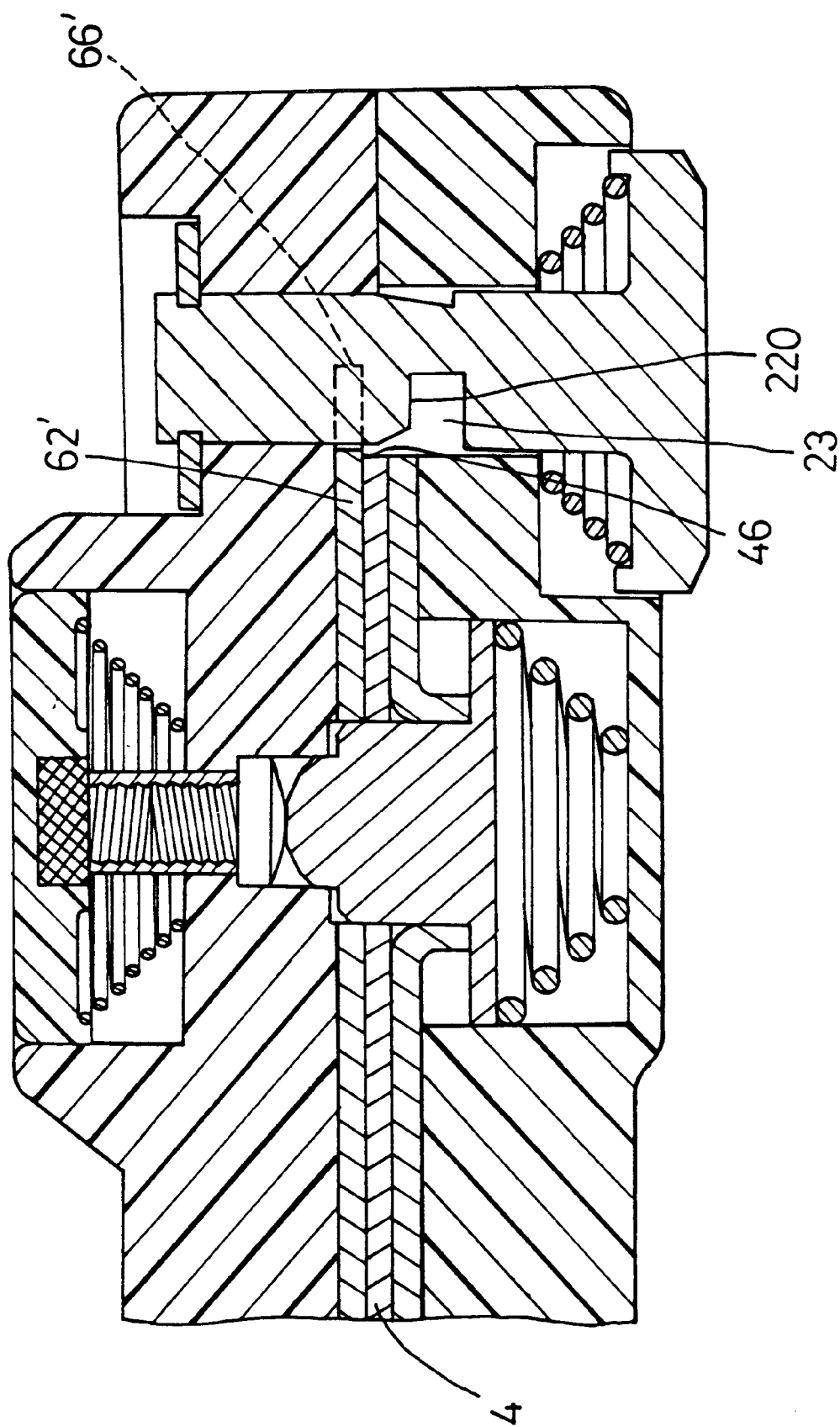
FIG. 5 is a horizontal fragmentary sectional view of a second preferred embodiment of the present invention when viewed from a top side while a saw blade is inserted thereinto.

Referring to FIG. 5, the second preferred embodiment of this invention differs from the first preferred embodiment in that the flange 66' is formed on the right wall 62'. In the first and second embodiments, the flange 66, 66' projects relative to the rear edge 46 of the saw blade 4 when the saw blade 4 is inserted into the coupling member. Operation of the second preferred embodiment is similar to that of the previous embodiment and will not be detailed further.

Referring to FIG. 12, the third preferred embodiment of the present invention differs from the first preferred embodiment in that the narrower section 524' of the positioning pin is formed as an integrated rod with a cross-section smaller than that of the slot of the saw blade. Under this condition, the locking unit requires only one biasing spring for biasing the locking pin from the unlocking position to the locking position.

It should be noted that the first and second preferred embodiments with the narrower section 524 of the locking unit 5 formed as two non-integrated segments 524a, 524b may be used with a saw blade which is not formed with a slot or which has a slot with a width smaller than the cross-section of the narrower section 524. The segments 524a, 524b have convex confronting faces which can be pushed resiliently away from one another by the rear edge of the saw blade for moving the locking unit 5 into and out of a locking hole of the saw blade.

With the provision of the coupling member 6 in the blade receiving space 31 of the handle body 30, a saw blade 4 can be assembled to and detached from the handle assembly of the present invention in a convenient manner without affecting the folding and unfolding operations of the saw blade on the handle assembly.

With this invention thus explained, it is apparent that numerous modifications and variations can be made without departing from the scope and spirit of this invention. It is therefore intended that this invention be limited only as indicated in the appended claims.

I claim:

1. A handle assembly for use with a saw blade to form a foldable saw, the saw blade being formed as an elongated flat plate with a top edge, a teethed bottom edge, a rear edge which extends between the top and bottom edges, and a rear end portion which is formed with a locking hole and a slot that extends from the locking hole to the rear edge, said handle assembly comprising:

an elongated handle body having left and right side walls that confine a longitudinal blade receiving space therebetween, a top wall that bridges top ends of said side walls, and a front end portion;

a coupling member mounted on said front end portion of said handle body within said blade receiving space, said coupling member having left and right walls which confine an insert slit therebetween, a front side formed with a front opening for access into said insert slit, and a rear side formed with a curved edge, said insert slit being aligned and communicated with said blade receiving space;

a locking unit which extends transversely between said left and right side walls of said handle body and which has a wider section with a cross-section corresponding with the locking hole of the saw blade, and a narrower section with a cross-section smaller than the locking hole, said locking unit extending through said left and right walls of said coupling member and permitting rotation of said coupling member relative to said handle body about said locking unit, said locking unit being mounted movably to said left and right side walls of said handle body so as to be movable therebetween for registering a selected one of said wider and narrower sections with said insert slit of said coupling member;

said insert slit of said coupling member being adapted to permit extension of the rear end portion of the saw blade thereinto via said front opening, said locking pin being operable between an unlocking position in which said narrower section is registered with said insert slit of said coupling member to permit movement of said locking unit into and out of the locking hole of the saw blade for insertion of the saw blade into said insert slit and for removal of the saw blade from said insert slit, and a locking position, in which said wider section is registered with said insert slit and is adapted to engage the locking hole of the saw blade to prevent removal of the saw blade from said insert slit, said coupling member being provided with abutment means adapted for engaging the rear end portion of the saw blade when the rear end portion of the saw blade is extended into said coupling member so that said coupling member is rotatable together with the saw blade relative to said handle body and about said locking unit between an unfolded position, in which the saw blade extends outwardly of said handle body, and a folded position, in which the saw blade is concealed within said blade receiving space of said handle body; and a positioning unit mounted on said handle body and operable so as to engage releasably said curved edge on said rear side of said coupling member to lock said coupling member in a selected one of said folded and unfolded positions.

2. The handle assembly according to claim 1, wherein said narrower section of said locking unit has a cross-section narrower than the slot of the saw blade so as to permit movement of said locking unit into and out of the locking hole of the saw blade via the slot when said locking unit is in the unlocking position.

3. The handle assembly according to claim 1, wherein said abutment means of said coupling member includes a top wall interconnecting top ends of said left and right walls and adapted to abut against the top edge of the saw blade, and a stop protrusion disposed in said insert slit and adapted to abut against the bottom edge of the saw blade.

4. The handle assembly according to claim 1, wherein said curved edge of said coupling member has upper and lower ends, said coupling member being formed with an upper positioning groove adjacent to said upper end of said curved edge for engaging releasably said positioning unit in order to position said coupling member in said unfolded position, and a lower positioning groove adjacent to said lower end of said curved edge for engaging releasably said positioning unit in order to position said coupling member in said folded position.

5. The handle assembly according to claim 4, wherein said positioning unit includes a shaft which extends transversely between said left and right side walls of said handle body and which is formed with a notch and an abutment shoulder adjacent to said notch, said shaft being mounted movably to said left and right side walls of said handle body so as to be movable therebetween from a first position, where said shaft engages a selected one of said upper and lower positioning grooves of said coupling member for positioning said coupling member in a selected one of said unfolded and folded positions, to a second position, where said notch is aligned with said blade receiving space for disengaging said shaft from said coupling member to permit pivoting movement of said coupling member relative to said handle body.

6. The handle assembly according to claim 5, wherein said positioning unit further comprises a biasing spring for biasing said shaft from said second position to said first position.

7. The handle assembly according to claim 1, further comprising a biasing spring for biasing said locking unit from said unlocking position to said locking position.

8. The handle assembly according to claim 7, wherein said narrower section of said locking unit is formed adjacent to said wider section, said locking unit having a first end disposed adjacent to said wider section, and a second end disposed adjacent to said narrower section, said locking unit further having a press knob which is mounted on said second end and which is disposed outwardly of said right side wall of said handle body, said press knob being operable to move said locking unit from said locking position to said unlocking position against action of said biasing spring, said biasing spring being mounted on said left side wall of said handle body and abutting against said first end of said locking unit for biasing said locking unit from said unlocking position to said locking position.

* * * * *